US010692310B2

(12) United States Patent
Westendorf et al.

(10) Patent No.: US 10,692,310 B2
(45) Date of Patent: Jun. 23, 2020

(54) DEVICE AND METHOD FOR DETERMINING LOAD PROFILES OF MOTOR VEHICLES

(71) Applicant: Robert Bosch GmbH, Stuttgart (DE)

(72) Inventors: Andreas Westendorf, Hildesheim (DE); Fabian Zwissler, Weinstadt (DE); Robert Exler, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 15/323,477

(22) PCT Filed: May 12, 2015

(86) PCT No.: PCT/EP2015/060497
§ 371 (c)(1),
(2) Date: Jan. 3, 2017

(87) PCT Pub. No.: WO2016/005086
PCT Pub. Date: Jan. 14, 2016

(65) Prior Publication Data
US 2017/0124779 A1 May 4, 2017

(30) Foreign Application Priority Data
Jul. 11, 2014 (DE) .......................... 10 2014 213 522

(51) Int. Cl.
*G07C 5/08* (2006.01)
*B60W 40/12* (2012.01)
(Continued)

(52) U.S. Cl.
CPC .......... *G07C 5/085* (2013.01); *B60R 16/0232* (2013.01); *B60W 40/12* (2013.01);
(Continued)

(58) Field of Classification Search
CPC ...... G07C 5/085; G07C 5/008; G07C 5/0808; B60R 16/0232; B60W 40/12;
(Continued)

(56) References Cited

U.S. PATENT DOCUMENTS 8,970,359 B2 * 3/2015 Barth ................... G07C 5/0808
340/425.5
2007/0001831 A1 * 1/2007 Raz ..................... B60R 16/0231
340/439

(Continued)

FOREIGN PATENT DOCUMENTS

DE    102008001803 A1    11/2009
DE    102008049754 A1    4/2010
(Continued)

OTHER PUBLICATIONS

Wikipedia, Sorting Algorithm, Jul. 2014 (Year: 2014).*
(Continued)

*Primary Examiner* — Alan D Hutchinson
(74) *Attorney, Agent, or Firm* — Norton Rose Fulbright US LLP; Gerard Messina

(57) ABSTRACT

An apparatus for determining stress profiles of motor vehicles, in particular of motor vehicles of a vehicle fleet, including at least one driving state determination apparatus disposed in a motor vehicle, the driving state determination apparatus being configured to repeatedly determine at least one driving state parameter of the motor vehicle and transfer it to at least one driving state evaluation apparatus; at least one driving state evaluation apparatus that is configured to assign a numerical stress parameter to each driving state parameter determined by the driving state determination apparatus; and an addition apparatus that is configured to add up the numerical stress parameters of a motor vehicle to yield a numerical total stress parameter.

10 Claims, 5 Drawing Sheets

(51) Int. Cl.
*B60R 16/023* (2006.01)
*G07C 5/00* (2006.01)
*B60W 50/00* (2006.01)

(52) U.S. Cl.
CPC ........... *G07C 5/008* (2013.01); *G07C 5/0808* (2013.01); *B60W 2050/0077* (2013.01); *B60W 2050/0089* (2013.01); *B60W 2510/0638* (2013.01); *B60W 2520/10* (2013.01); *B60W 2520/105* (2013.01); *B60W 2520/125* (2013.01); *B60W 2530/14* (2013.01); *B60W 2556/45* (2020.02)

(58) Field of Classification Search
CPC ....... B60W 2520/125; B60W 2530/14; B60W 2520/10; B60W 2510/0638; B60W 2050/0089; B60W 2050/0077; B60W 2550/40; B60W 2520/105

See application file for complete search history.

(56) References Cited

U.S. PATENT DOCUMENTS

| | | |
|---|---|---|
| 2007/0100518 A1 | 5/2007 | Cooper |
| 2013/0190967 A1* | 7/2013 | Hassib ................. G06Q 10/00 701/31.5 |
| 2013/0244210 A1 | 9/2013 | Nath et al. |
| 2013/0302758 A1* | 11/2013 | Wright ................. G07C 5/008 434/65 |

FOREIGN PATENT DOCUMENTS

| | | |
|---|---|---|
| EP | 2056179 A2 | 5/2009 |
| GB | 2473956 A | 3/2011 |
| WO | 2009138284 A2 | 11/2009 |
| WO | 2012079716 A1 | 6/2012 |

OTHER PUBLICATIONS

International Search Report, dated Sep. 30, 2015, of the corresponding International Application PCT/EP2015/060497 dated May 12, 2015.

* cited by examiner

DEVICE AND METHOD FOR DETERMINING LOAD PROFILES OF MOTOR VEHICLES

FIELD

The present invention relates to an apparatus and a method for determining stress profiles of motor vehicles, in particular of motor vehicles of a vehicle fleet.

BACKGROUND INFORMATION

A need often exists for determining the stress, and the wear resulting therefrom, on motor vehicles of a vehicle fleet. This can be accomplished based on driving profiles that map the utilization of the motor vehicle. Such driving profiles can be generated on the basis of GPS data that make available the current position and speed of the motor vehicle. Systems based on GPS data supply exact information regarding driving behavior. This results in legal (data-protection) problems, however, since exact movement profiles of the motor vehicle and its driver can be created.

An object of the present invention is to furnish an alternative apparatus and an alternative method for determining stress profiles of motor vehicles, in particular of motor vehicles of a vehicle fleet, the stress profiles being capable of being generated without creating an exact movement profile of the respective motor vehicle.

SUMMARY

An example method according to the present invention for determining stress profiles of motor vehicles of a vehicle fleet may include, for example:
  repeatedly determining at least one driving state parameter of the motor vehicle, and transferring it to at least one driving state evaluation apparatus;
  by way of the driving state evaluation apparatus, assigning a numerical stress parameter to each of the driving state parameters determined by the driving state determination apparatus; and
  adding up the numerical stress parameters of a motor vehicle to yield a numerical total stress parameter.

An example apparatus according to the present invention for determining stress profiles of motor vehicles of a vehicle fleet may include, for example:
  at least one driving state determination apparatus in each motor vehicle of the vehicle fleet, the driving state determination apparatus being configured to repeatedly determine at least one driving state parameter of the motor vehicle and transfer it to at least one driving state evaluation apparatus;
  at least one driving state evaluation apparatus that is configured to assign a numerical stress parameter to each driving state parameter determined by the driving state determination apparatus; and
  an addition apparatus that is configured to add up the numerical stress parameters of a motor vehicle to yield a numerical total stress parameter.

The present invention makes it possible to determine, based on driving state parameters, driving profiles from which the utilization, stress, and wear on a motor vehicle can be determined, the driving state parameters not encompassing the exact location of the motor vehicle so that movement profiles of the motor vehicle and its driver cannot be created. The use and wear on the motor vehicles, in particularly including comparatively for the motor vehicles of a vehicle fleet, can thus be determined without the legal (data-protection) problems associated with the evaluation of GPS data.

In an embodiment, a comparison apparatus that is configured to compare with one another the numerical total stress parameters of several motor vehicles, in particular the motor vehicles of a vehicle fleet, is additionally provided. The comparison apparatus can encompass in particular a sorting apparatus that is configured to sort the motor vehicles based on their total stress parameters. A ranking list of the motor vehicles can thereby be created, making it possible to identify particularly highly stressed vehicles that are exposed to particularly severe wear.

In an embodiment, the driving state evaluation apparatus encompasses a memory apparatus in which first and second entries are stored, each second entry being linked to at least one first entry; and a comparison and assignment apparatus that is configured to select a first entry by comparing a driving state parameter with the first entries, and to assign to the driving state parameter, as a stress parameter, a second entry linked to the first entry. The first entries can identify, in particular, the boundaries of ranges, so that driving state parameters that lie in a range identified by the first entries have a corresponding second entry assigned to them as a stress parameter.

The corresponding stress parameters can be assigned particularly effectively to the driving state parameters thanks to a comparison and assignment apparatus of this kind.

The driving state parameters can encompass, in particular, the operating duration, speed, longitudinal and/or transverse acceleration of the vehicle, and the rotation speed of the engine. Alternatively or additionally, the driving state parameters can also encompass the variability of these magnitudes during the journey, in particular in the form of a statistical standard deviation.

The operating duration, speed, and longitudinal and/or transverse acceleration are magnitudes representative of the utilization of and stress on the motor vehicle. An evaluation of the variability of these parameters, for example in the form of the statistical standard deviation, furthermore makes it possible to determine whether the motor vehicle is being used more uniformly, or more nonuniformly with highly fluctuating parameters. The latter results in greater wear, which can be identified and taken into consideration based on evaluation of the variability. The quality of the stress profiles is therefore improved if the variability or fluctuation of the driving state parameters is taken into consideration.

The driving state evaluation apparatus can be configured in particular to determine how often a driving state parameter exceeds a predefined limit value assigned to the driving state parameter, and to assign a numerical stress parameter to the number of exceedances of the limit value during a journey of the motor vehicle.

If individual driving state parameters exceed predefined limit values, this can result in a particularly high level of wear on the motor vehicle. This elevated wear can be taken into consideration by detecting and counting the number of exceedances of such limit values when creating the driving profile, in order to improve even further the quality and predictive value of the stress profiles.

In an exemplifying embodiment, the driving state evaluation apparatus is configured to determine a stress parameter from a combination of at least two driving state parameters. The extent of the stress on a motor vehicle is often apparent only from a combination of several driving state parameters. For example, the wear caused by braking and acceleration events can be dependent on the rate at which those braking and acceleration actions are carried out.

Determining stress parameters, for example with the aid of a matrix or table, from a combination of at least two driving state parameters, for example the speed and a longitudinal or transverse acceleration of the motor vehicle, therefore enhances the quality and predictive value of the stress profile.

In an exemplifying embodiment, the device additionally has at least one transfer apparatus that is configured to transfer a driving state parameter, in particular wirelessly, from the driving state determination apparatus to the driving state evaluation apparatus. In this case the driving state parameters are continuously detected in the motor vehicle and either transferred immediately, with the aid of the transfer apparatus, to an external, in particular centralized, driving state evaluation apparatus in order to be evaluated therein. A memory apparatus can also be provided in the motor vehicle in order to firstly store the detected driving state parameters in the motor vehicle and transfer them collectively to the driving state evaluation apparatus at predetermined points in time, for example upon completion of the journey/shutoff of the engine. The data transfer outlay can thereby be reduced. If the motor vehicles, for example as constituents of a vehicle fleet, repeatedly travel to defined points, e.g., predetermined garages, service points, and/or filling stations, the data transfer can be carried out inexpensively at those defined points using a short-range data connection that, in particular, dispenses with the use of a mobile radio network.

Alternatively, the stress parameters can be determined within the motor vehicle from the driving state parameters, so that instead of the driving state parameters, it is the stress parameters that are transferred with the aid of the transfer apparatus from the driving state evaluation apparatus, which in this case is disposed in the motor vehicle, to the addition apparatus. This even further improves data protection, since no driving state parameters, but only the more abstract stress parameters, are thus transferred.

DETAILED DESCRIPTION OF EXAMPLE EMBODIMENTS

Figure 1:
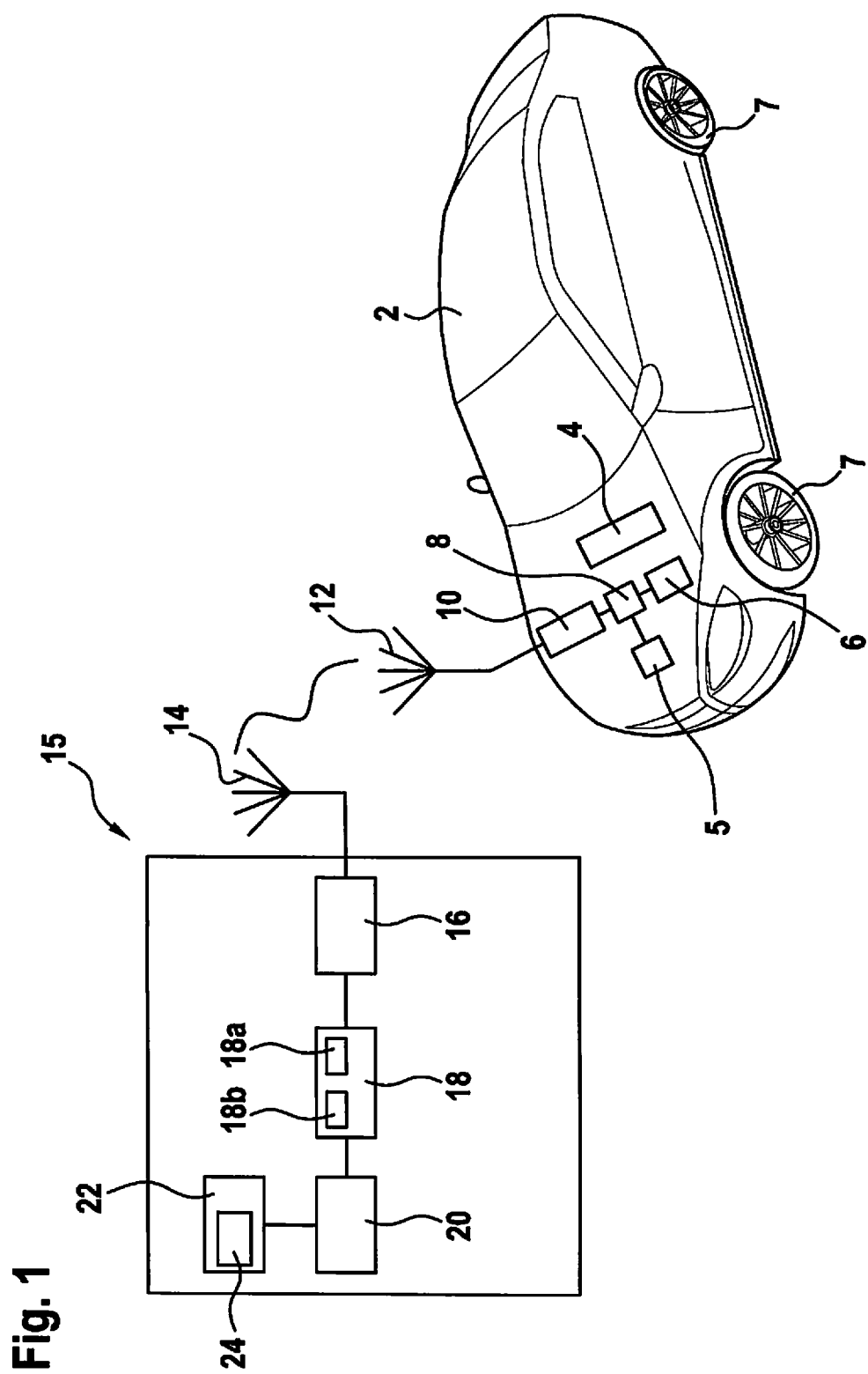
FIG. 1 is a schematic view of a motor vehicle having an apparatus according to the present invention for determining its stress profile.

FIG. 1 is a schematic view showing a motor vehicle 2 having an engine 4 and an apparatus according to the present invention for determining its stress profile.

Provided in motor vehicle 2 is a driving state determination apparatus 8 that is connected to several sensors 5, 6 in order to determine driving state parameters of motor vehicle 2, for example its operating duration, speed, acceleration in a longitudinal and/or transverse direction, etc. Driving state determination apparatus 8 is also connected to a transfer apparatus 10 that is configured to transfer the driving state parameters determined by driving state determination apparatus 8, with the aid of an antenna 12, wirelessly to a server 15 disposed outside motor vehicle 2. The transfer can be accomplished, for example, via WLAN, Bluetooth, or a mobile radio connection.

Server 15 has a receiving apparatus 16 having an antenna 14 for receiving the signals emitted from transfer apparatus 10.

The driving state parameters of motor vehicle 2 which are received by receiving apparatus 16 are forwarded from receiving apparatus 16 to a driving state evaluation apparatus 18 that is configured to assign a numerical stress parameter to each of the driving state parameters transferred from driving state determination apparatus 8 via the data connection.

Driving state evaluation apparatus 18 encompasses for this purpose a memory apparatus 18a in which at least first and second entries are stored, each second entry being linked to at least one first entry. Driving state evaluation apparatus 18 furthermore encompasses a comparison and assignment apparatus 18b that is configured to select, by comparing a driving state parameter transferred from receiving apparatus 16, a first entry that matches the transferred driving state parameter in the context of a predefined tolerance, or that identifies a range in which the transferred driving state parameter is located, and to assign to that driving state parameter, as a stress parameter, a second entry linked to the first entry.

The stress parameter assigned in that manner is delivered to an addition apparatus 20 that is configured to add up the numerical stress parameters of a motor vehicle which have been determined on the basis of the driving state parameters transferred during a journey of motor vehicle 2, in order to determine a numerical total stress parameter of the journey of motor vehicle 2.

The server also encompasses a comparison apparatus 22 that allows the numerical total stress parameters of several motor vehicles 2 of a vehicle fleet to be compared with one another in order to identify highly and less highly stressed motor vehicles 2. Comparison apparatus 22 can in particular also be configured with a sorting apparatus 24 that allows motor vehicles 2 to be sorted on the basis of the total stress parameters assigned to them. A ranking list of motor vehicles 2 can thereby be created, in which list motor vehicles 2 are sorted in accordance with their stress so that both highly stressed and less-stressed motor vehicles 2 can be easily and quickly recognized on the basis of their position respectively at the beginning or end of the ranking list.

A description will be given below, with reference to a few examples, of how the associated stress parameters can be determined from various driving state parameters.

Speed:

A first example of a driving state parameter is the current speed of motor vehicle 2. A high degree of wear on motor vehicle 2 is not necessarily associated with a high speed of motor vehicle 2. It has instead been found that it is in fact city traffic, with its moderate speed range, that results in a high degree of stress and wear on motor vehicle 2; a similar level of stress occurs again only at very high speeds of more than 160 km/hour.

The stress parameters that result from the respective speed of motor vehicle 2 are therefore assigned to the "speed" motor vehicle state parameter, for example, in accordance with Table 1 below.

TABLE 1

| Speed | Stress parameter |
|---|---|
| 0-60 km/h | 10 |
| 60-130 km/h | 5 |
| 130-160 km/h | 2 |
| >160 km/h | 10 |

Evaluation of the speed can be optimized by the fact that the maximum speeds in effect in the respective country on various roads (city traffic, main road, state highway, Autobahn, freeway, highway) are utilized in order to determine the kind of road on which motor vehicle 2 is traveling. As mentioned, urban journeys generally result in greater wear on motor vehicle 2 than journeys on expressways, even though the latter are generally made at higher speeds.

The country in which motor vehicle 2 is currently traveling can be determined by a manual input, or by evaluation of the mobile radio operator currently being used and/or of the receivable radio stations. Alternatively, a GPS signal can also be utilized; for data-protection reasons, only the country in which motor vehicle 2 is currently located is determined from the GPS information, without completely evaluating the GPS information in order to determine the exact location of motor vehicle 2.

Acceleration:

Another driving state parameter that influences the wear on motor vehicle 2 is acceleration in the longitudinal and transverse direction.

It has been found in this context that it is less the absolute amount of acceleration or its average over the entire journey, and more the variability in speed over the course of a journey, that is a good indicator of the stress on motor vehicle 2.

One possibility for numerically detecting the variability in acceleration is to determine the standard deviation, around their average, of the accelerations occurring in the course of a journey of motor vehicle 2, and to assign a numerical stress parameter to that standard deviation.

A large standard deviation, i.e., a large fluctuation in the positive and negative accelerations occurring during the journey, allows an aggressive driving style to be inferred, which results in a high level of wear on motor vehicle 2. A defensive driving style minimizing the impact on motor vehicle 2, on the other hand, results in a narrow distribution of accelerations around their average, and thus a small standard deviation.

Engine Speed:

In addition to speed and acceleration, the rotation speed of engine 4 can also be detected and evaluated in order to determine the stress on motor vehicle 2, in particular on engine 4, on the clutch (not shown), and on tires 7. For example, gear change events can be identified based on large fluctuations in rotation speed, and the stress and wear on the clutch can be inferred therefrom. Maintenance intervals for the clutch, and a possibly necessary replacement of clutch linings as a function of the wear on motor vehicle 2, can thereby be determined ("predictive maintenance"), so that overly long maintenance intervals in a context of heavy utilization of motor vehicle 2 and/or an aggressive driving style can be avoided, as can unnecessarily short maintenance intervals in a context of little and/or low-impact use of motor vehicle 2.

Exceedance of Limit Values:

In addition to an evaluation of the standard deviation, limit values for speed and/or acceleration can be defined, a stress counter being incremented each time a driving state parameter ascertained in the course of a journey of motor vehicle 2 exceeds such a limit value. The sum of the limit value exceedances ascertained during a journey is assigned to a stress parameter after completion of the journey. Driving states that are particularly relevant to stress and wear, for example particularly hard acceleration, hard braking, and/or high engine speeds, in particular engine speeds above the "red line," can thereby be detected and utilized for evaluation.

Once the journey is complete, the stress parameters collected in the course of the journey can be added up in order to determine a total stress parameter.

A ranking list of motor vehicles 2 can be created on the basis of the total stress parameter that represents the sum of the individual stress parameters.

Alternatively, a separate ranking list can be created for each individual driving state parameter or stress parameter, in order to generate driving state parameter-specific ranking lists. In this case an overall ranking list can be created on the basis of the positions of motor vehicles 2 in the driving state parameter-specific ranking lists.

The ranking lists can be evaluated in particular using a 20/60/20 approach, in which the 20% of the motor vehicles 2 of a vehicle fleet which exhibit the 20% highest total stress parameters are assigned to a first, high-stress category, and the last 20% of motor vehicles 2 of a vehicle fleet which exhibit the 20% lowest total stress parameters are assigned to a second, low-stress class.

Combinations of Driving State Parameters:

Evaluation of the driving states of motor vehicle 2 can be even further improved by utilizing combinations of different driving state parameters for the evaluation.

Figure 2:
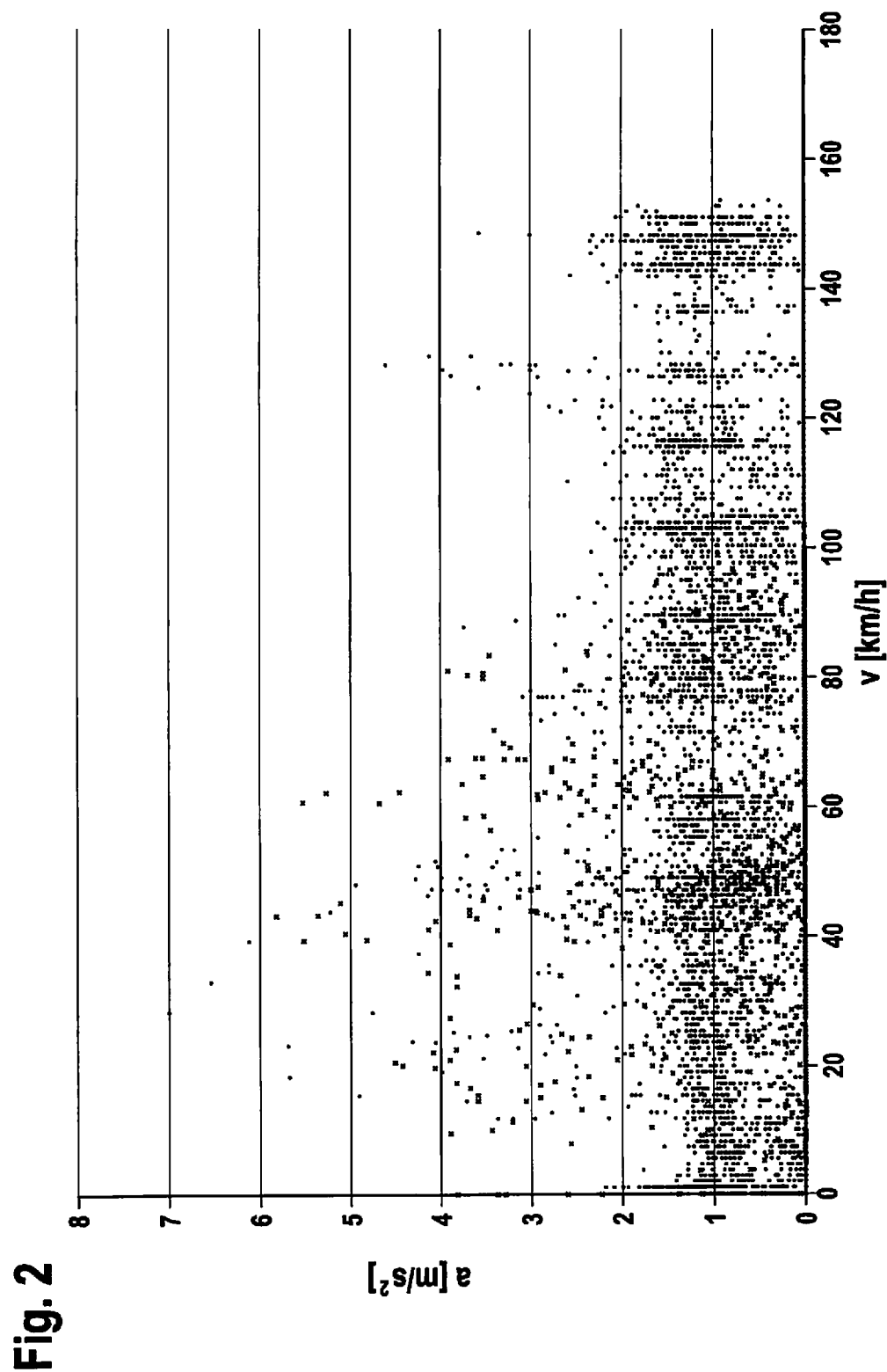
FIG. 2 shows the distribution of longitudinal acceleration against speed for two different motor vehicles.

FIG. 2 shows, by way of example, the distribution of longitudinal acceleration (on the vertical axis) plotted against speed (on the horizontal axis) for two different motor vehicles 2 that are respectively represented by crosses and squares.

It is evident from what is depicted in FIG. 2 that the greatest acceleration occurs in a speed range of approximately 25 km/h. This can indicate a nervous driver, or a situation in which the driver accelerates at a traffic light turning yellow in order to pass through before the red light. Both instances result in elevated wear on motor vehicle 2.

Hard accelerations generally do not occur at high speeds of more than 100 km/h (i.e., in particular on an expressway), since motor vehicles 2 proceed most of the time at a predefined speed. Hard accelerations in this speed range indicate a restless driving style that is also suitable for increasing wear. The values ascertained for the longitudinal acceleration of a motor vehicle 2 can therefore be assigned to different stress parameters as a function of the respectively associated speed of motor vehicle 2, as shown in Table 2 below.

TABLE 1

| Speed | Hard acceleration | Particularly hard acceleration |
|---|---|---|
| <50 km/h | 4.0 m/s$^2$ | 5.5 m/s$^2$ |
| 50-100 km/h | 3.5 m/s$^2$ | 5.0 m/s$^2$ |
| >100 km/h | 3.0 m/s$^2$ | 4.5 m$^2$ |

Figure 3:
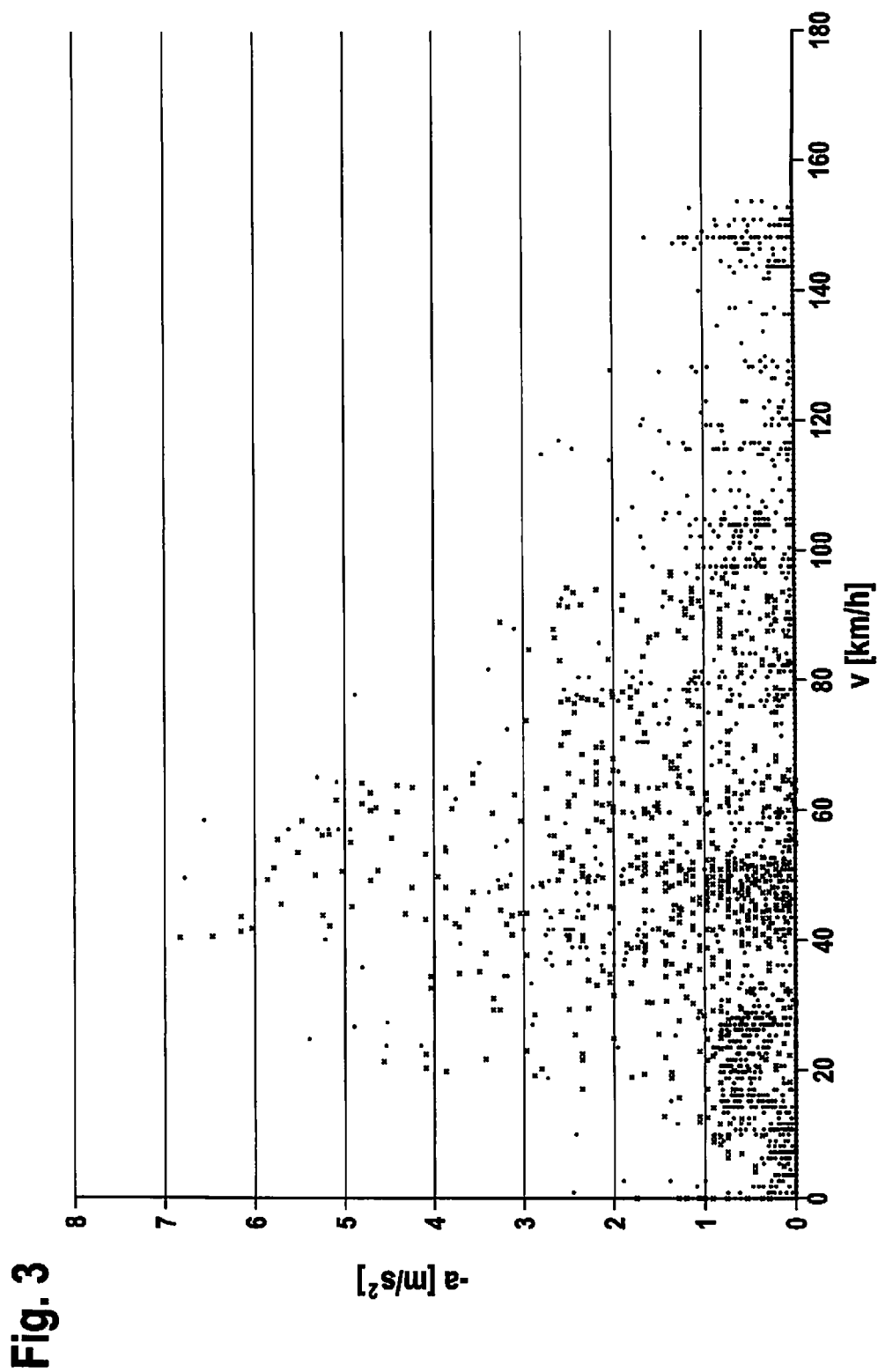
FIG. 3 is a depiction, corresponding to FIG. 2, for negative accelerations that identify braking events.

FIG. 3 is a depiction corresponding to FIG. 2—i.e., acceleration on the vertical axis as a function of speed on the horizontal axis—for negative accelerations that identify braking events.

The highest negative accelerations occur in the region of approximately 50 km/h, i.e., in city traffic, and correspond to hard braking which results in a high level of wear on motor vehicle 2. In the higher speed range, on the other hand, in particular at speeds of more than 100 km/h, almost no hard braking events occur.

Figure 4:
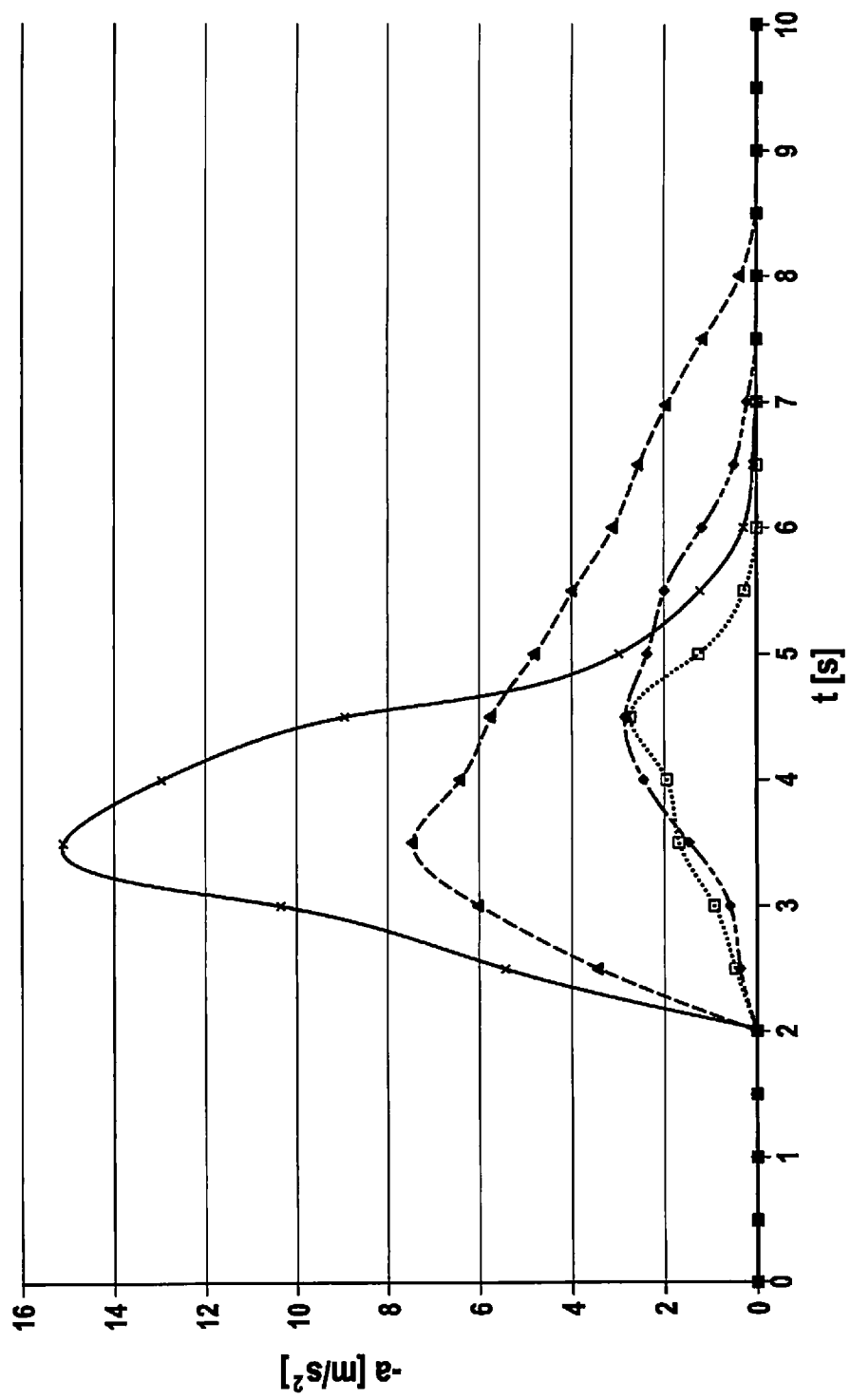
FIG. 4 shows the transverse accelerations occurring during a journey, as a function of speed.

Braking Profiles:

A variety of braking types that result in different stresses on motor vehicle 2 can be differentiated on the basis of the braking profiles shown in FIG. 4, in which negative acceleration is plotted against time.

The dot-dash line describes a moderate braking pattern in which the driver decelerates slowly and then either stops or continues at low speed. This braking pattern corresponds to a proactive driving style of a safe and relaxed driver, resulting in little wear on motor vehicle 2.

The dotted line shows the braking profile of a proactive driver who drives proactively and effectively anticipates the traffic situation. He or she carries out only gentle braking actions but then quickly releases the brake (steep drop in the curve after its peak at approx. 4.5 s). This driving style results in slightly greater wear than the moderate driving style previously described.

The dashed line shows the braking profile of a driver who brakes hard, for example because the distance to the preceding vehicle has become too short; after the sharp initiation of the braking event, motor vehicle 2 is then decelerated more smoothly. This nervous driving style results in elevated wear on motor vehicle 2 and is therefore assigned to a relatively high stress parameter.

Lastly, the solid line shows the braking profile of a hard braking event due to an unexpected traffic situation. This is associated with particularly severe wear on motor vehicle 2 (=high stress parameter).

The various braking profiles can be differentiated based on their respective gradients. The braking event begins with a positive gradient of the negative acceleration (increasing braking effect) until the maximum is reached. The braking effect then decreases until the (negative) acceleration reaches zero. Once both gradients (for the regions before and after the maximum of the curve) have been calculated, the associated braking profile can be determined. Gradients of more than 4 m/s$^3$ in particular indicate sudden and/or intense braking that results in a high level of stress and wear on motor vehicle 2, and are therefore assigned to high stress parameters.

The stress profiles of motor vehicle 2, in particular the stress profiles based on the braking profiles, can be used to estimate the wear on tires 7 and on the brakes, especially the brake pads, of motor vehicle 2, and to determine maintenance intervals, in particular for replacing tires 7 and/or the brake pads.

Transverse Acceleration:

The transverse acceleration of motor vehicle 2 can also be evaluated as a function of speed. This improves the result of the evaluation, since high transverse accelerations occur in urban areas at relatively low speeds even with a defensive driving style because of the tight radii, for example when turning, whereas the same transverse accelerations in higher speed ranges indicate a nervous driving style.

Table 3 shows, by way of example, the transverse accelerations that occur when negotiating, at the indicated speed, curves that have the indicated radius R.

TABLE 3

| Speed (km/h) | Curve radius (m) | Transverse acceleration (m/s$^2$) |
|---|---|---|
| 50 | 80 | 2.4 |
| 60 | 120 | 2.3 |
| 70 | 180 | 2.1 |
| 80 | 250 | 1.9 |
| 90 | 340 | 1.8 |
| 100 | 450 | 1.7 |
| 120 | 720 | 1.5 |

This shows that the results of the evaluation of the transverse accelerations can be appreciably improved if the transverse accelerations are evaluated in combination with the respective speed.

Figure 5:
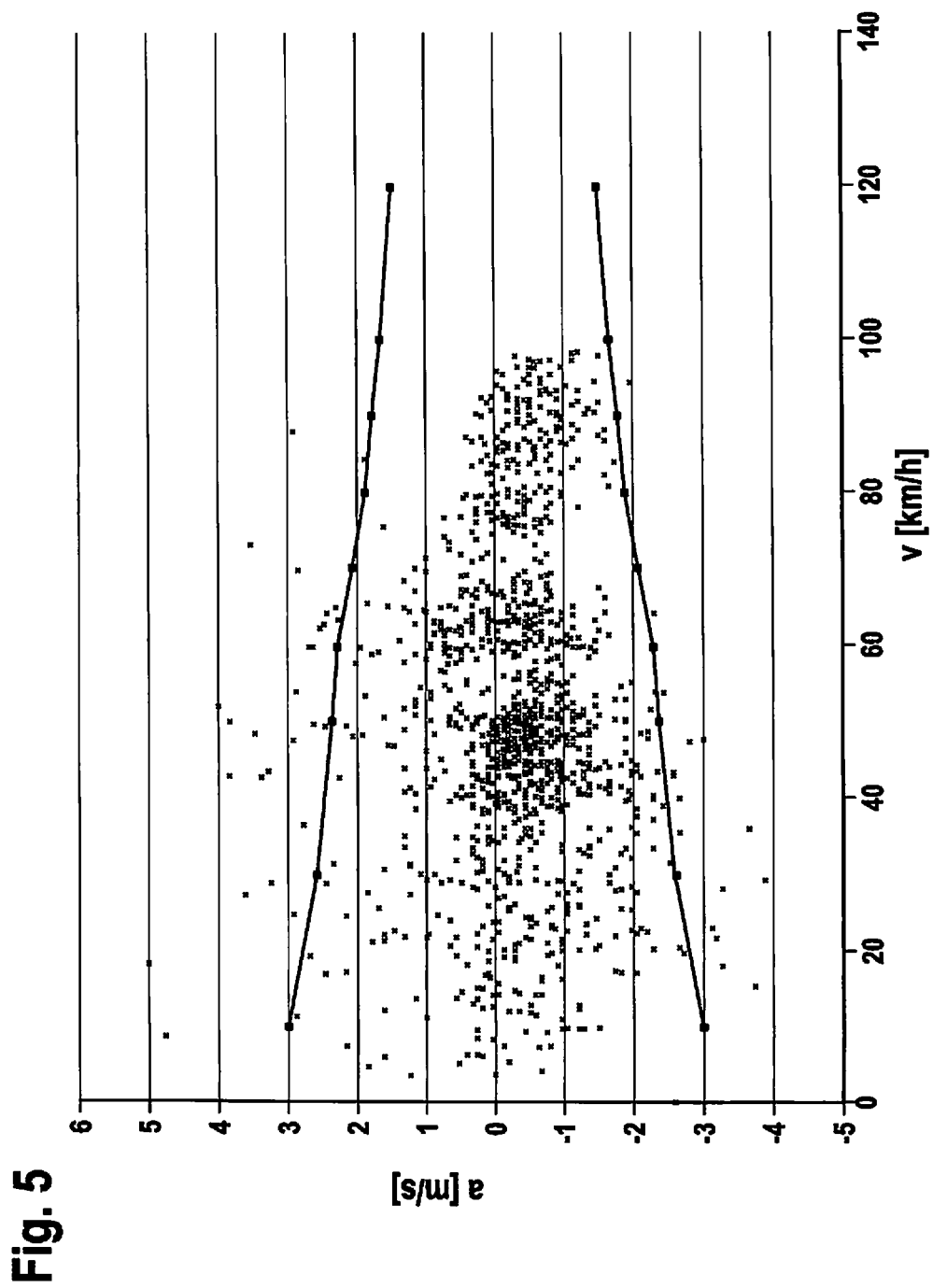
FIG. 5 shows transverse accelerations occurring during a journey.

FIG. 5 shows, by way of example, the transverse accelerations occurring during a journey, plotted on the vertical axis as a function of speed on the horizontal axis. The dashed lines designate the maximum transverse accelerations provided for in the design of the roads for the respective speed. Acceleration values beyond (above or below) the dashed lines therefore indicate driving states in which motor vehicle 2 is outside the region provided for in the context of the design of the respective road, i.e., is driving too fast through the curve. Driving states of this kind are generally associated with high stress and, resulting therefrom, a high level of wear on motor vehicle 2, and are therefore assigned to a high stress parameter.

Duration of Journey:

The journey duration of motor vehicle 2 can also be utilized in order to determine the stress and wear on motor vehicle 2. In particular, the proportion of the current journey duration in terms of the total driving time over the last 30 days can be evaluated in order to determine whether motor vehicle 2 has been uniformly or nonuniformly used in the last 30 days; nonuniform use of motor vehicle results in elevated wear, and is therefore assigned to an elevated wear parameter.

Particularly short journey durations, which result in disproportionately high stress on motor vehicle 2 because engine 4 does not reach its operating temperature, can also be assigned to a particularly high wear parameter.

The invention claimed is:

1. An apparatus for determining stress profiles of motor vehicles of a vehicle fleet, comprising:
   at least one driving state determination apparatus disposed in a motor vehicle, the driving state determination apparatus being configured to repeatedly determine at least one driving state parameter of the motor vehicle and transfer it to at least one driving state evaluation apparatus;
   at least one driving state evaluation apparatus that is configured to assign a numerical stress parameter to each driving state parameter determined by the driving state determination apparatus; and
   an addition apparatus configured to add up the numerical stress parameters to yield a numerical total stress parameter,
   wherein the stress profiles are based on braking profiles,
   wherein the braking profiles are differentiated based on calculated gradients,
   wherein the at least one driving state parameter includes at least one of a speed, a longitudinal acceleration or a transverse acceleration of the motor vehicle, and the driving state evaluation apparatus is configured to assign a stress parameter to a combination of the longitudinal and transverse acceleration and the speed.

2. The apparatus as recited in claim 1, further comprising:
a comparison apparatus configured to compare with one another the numerical total stress parameters of several motor vehicles, the comparison apparatus including a sorting apparatus that is configured to sort the motor vehicles based on their total stress parameters.

3. The apparatus as recited in claim 1, wherein the driving state evaluation apparatus includes:
   a memory apparatus in which first and second entries are stored, each second entry being linked to at least one first entry; and
   a comparison and assignment apparatus configured to select a first entry by comparing a driving state parameter with the first entries, and to assign to the driving state parameter, as a stress parameter, a second entry linked to the first entry.

4. The apparatus as recited in claim 1, wherein the driving state parameter includes at least one of the magnitudes: i) operating duration, speed, longitudinal, and/or transverse acceleration, of the motor vehicle, ii) rotation speed of an engine, and iii) a standard deviation of at least one of the magnitudes during a journey of the motor vehicle.

5. The apparatus as recited in claim 1, wherein the driving state evaluation apparatus is configured to determine how often a driving state parameter exceeds a predefined limit value assigned to the driving state parameter, and to assign a numerical stress parameter to the number of exceedances of the limit value during a journey of the motor vehicle.

6. The apparatus as recited in claim 1, wherein the driving state evaluation apparatus is configured to determine a stress parameter from a combination of at least two driving state parameters.

7. The apparatus as recited in claim 6, wherein the combination of the at least two driving state parameters includes a speed of the motor vehicle, a longitudinal acceleration of the motor vehicle, and a transverse acceleration of the motor vehicle.

8. The apparatus as recited in claim 1, further comprising:
at least one transfer apparatus configured at least one of:
   i) to transfer driving state parameters wirelessly from the driving state determination apparatus to the driving state evaluation apparatus, and ii) to transfer stress parameters wirelessly from the driving state evaluation apparatus to the addition apparatus.

9. A method for determining stress profiles of motor vehicles of a vehicle fleet, the method comprising:
repeatedly determining at least one driving state parameter of the motor vehicle;
assigning a numerical stress parameter to each of the determined driving state parameters; and
adding up the numerical stress parameters of a motor vehicle to yield a numerical total stress parameter,
wherein the stress profiles are based on braking profiles,
wherein the braking profiles are differentiated based on calculated gradients,
wherein the at least one driving state parameter includes at least one of a speed, a longitudinal acceleration or a transverse acceleration of the motor vehicle, and the driving state evaluation apparatus is configured to assign a stress parameter to a combination of the longitudinal and transverse acceleration and the speed.

10. The method as recited in claim 9, further comprising:
comparing with one another the numerical total stress parameters of several motor vehicles of the vehicle fleet, and sorting the motor vehicles based on their total stress parameters.

\* \* \* \* \*